United States Patent [19]

Sanders

[11] Patent Number: 4,714,092

[45] Date of Patent: Dec. 22, 1987

[54] BALL VALVE AND FLOWING FLUID PRESSURE AMPLIFIER

[75] Inventor: George S. Sanders, Las Vegas, Nev.

[73] Assignee: Agricultural Aviation Engineering Company, Las Vegas, Nev.

[21] Appl. No.: 9,886

[22] Filed: Feb. 2, 1987

[51] Int. Cl.$^4$ .......................................... F16K 11/087
[52] U.S. Cl. .............................. 137/894; 137/625.47; 417/186
[58] Field of Search ................................ 137/625–647, 137/891, 894; 417/178, 181, 182, 183, 186, 188, 190

[56] References Cited

U.S. PATENT DOCUMENTS

| | | | |
|---|---|---|---|
| 954,270 | 4/1910 | Eberman | 417/181 |
| 1,661,002 | 2/1928 | McClymont | 417/181 |
| 1,986,489 | 1/1935 | Wahlbom | 417/186 |
| 3,352,320 | 11/1967 | Camp | 137/894 |
| 3,515,502 | 6/1970 | Coordes | 137/894 X |
| 4,573,498 | 3/1986 | Ludwig | 137/625.47 |

OTHER PUBLICATIONS

Ametek, Schutte & Koerting Division–advertisement on jet ejectors.
The Jet-Vac Corporation, bulletin No. JVA-18 on hydro-jet ejectors.

*Primary Examiner*—Robert G. Nilson
*Attorney, Agent, or Firm*—Jack M. Wiseman

[57] ABSTRACT

A ball valve with a venturi chamber internal thereto as an integral part of the ball itself. The ball valve of the present invention includes a housing with a ball valve rotatably mountable therewithin. The ball is rotatably about an axis about which any cross-section thereof has a uniform outline curve with two passages defined therewithin. The first passage has a uniform cross-sectional shape and area, and extends through the ball with the central axis of the first passage being substantially perpendicular to the rotational axis of the ball. The first passage is tapered varying over its length. The smaller end of the tapered passage extends toward the other side of the ball defining a tapering annular cavity extending into the ball from the other side. The second passage has uniform shape and area, and opens into the annular cavity. The central axis of the second passage is also substantially perpendicular to the rotational axis of the ball. In addition, the housing defines first and second ports for communicating with opposite ends of the first passage and a third port for communicating with the second passage or the opposite solid side of the ball with the ball rotated through 180 degrees. Additionally, the housing is configured so that the third port is disposed to communicate with the second passage when the first and second ports are in communication with the one and other ends of the first passage, respectively.

12 Claims, 4 Drawing Figures

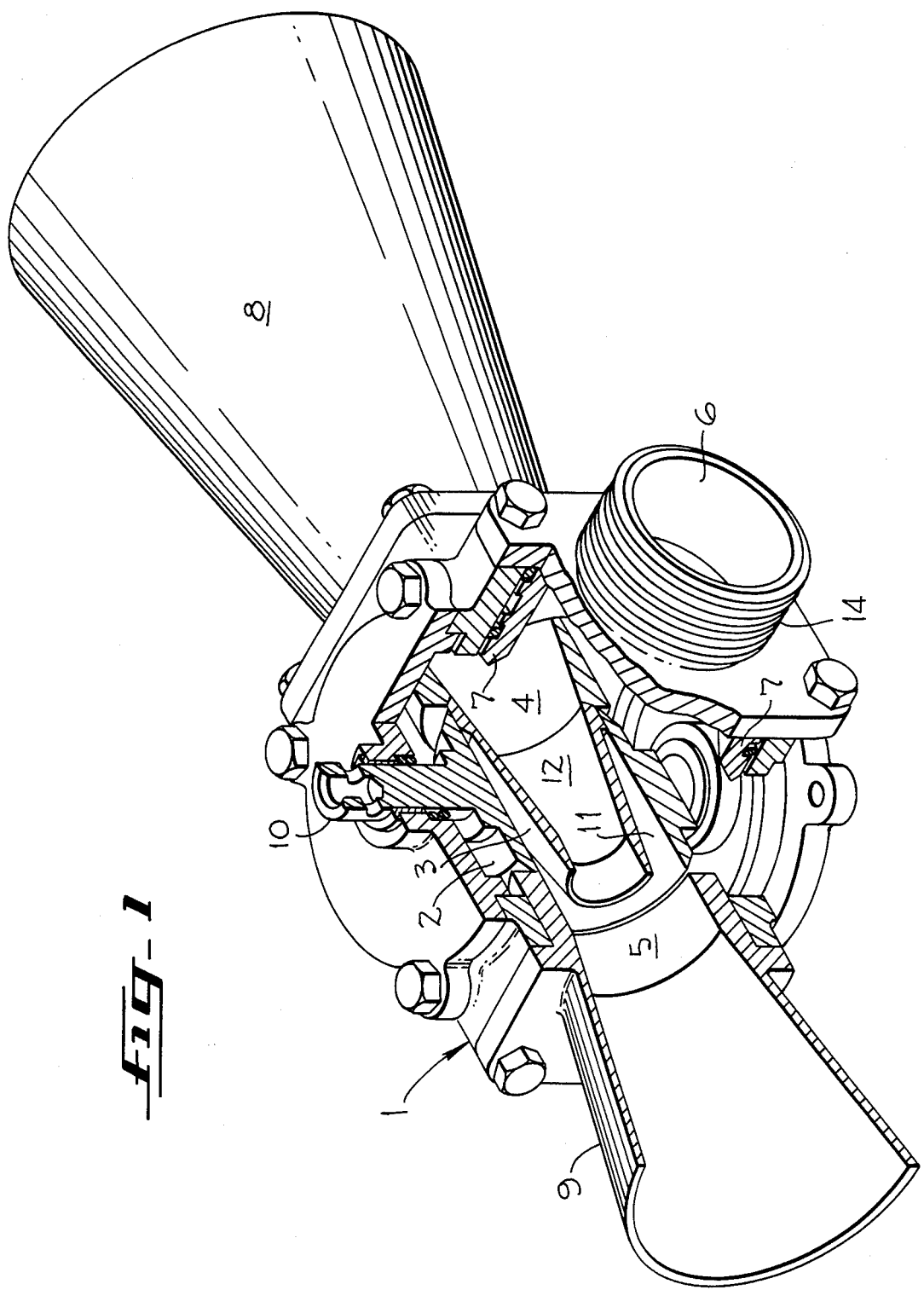

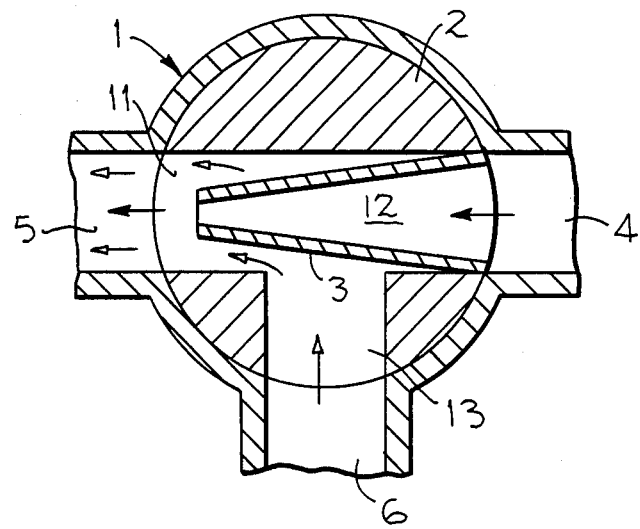
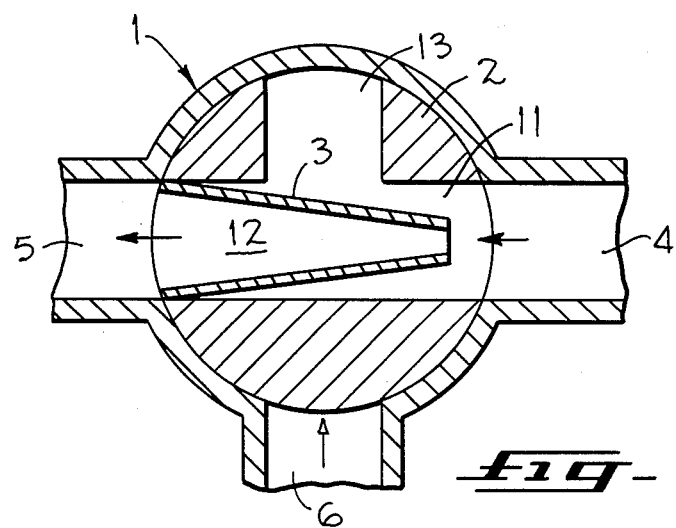
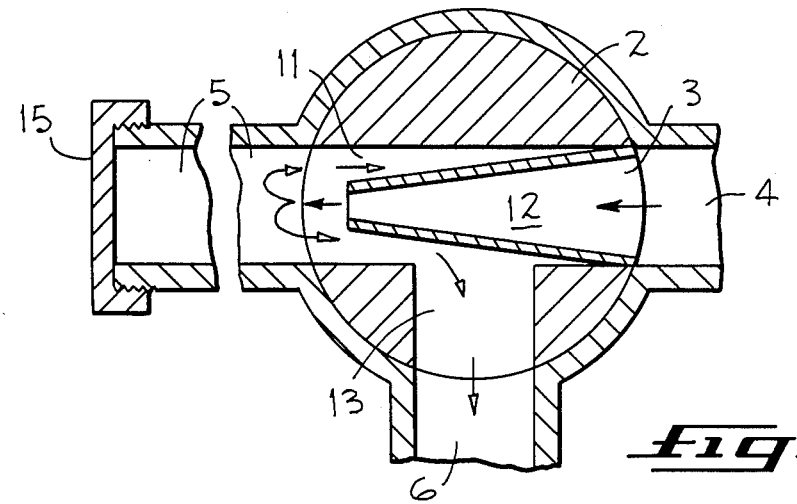

BALL VALVE AND FLOWING FLUID PRESSURE AMPLIFIER

BACKGROUND OF THE INVENTION

The present invention relates to ball valves and more particularly to a ball valve that includes a vacum-creating venturi wherein the venturi is within the ball of the valve.

There are many applications where a fluid is stored in a tank until delivery of measured quantities of the fluid is desired. Delivery of a fluid from such a tank can be accomplished in various ways including the use of a pump of a venturi valve system. Pumps require a separate power source and a venturi system requires a flowing fluid with which the fluid to be delivered from the tank is mixed before it is discharged.

In applications where the mixing of the stored fluid with the flowing fluid is at least not detrimental or where it is desirable, the use of a venturi valve system is attractive. A venturi system is a passive device that is generally smaller in size, uses less power, is less complex and is lighter in weight than a pump. In aerial spraying applications it is necessary to atomize the chemicals to be sprayed. In such an application, the forward motion of the aircraft creates a fluid flow with respect to the aircraft, namely air flow, which may be utilized as the ram fluid in a venturi evacuatio system, as well as providing the air necessary to atomize the chemicals for spraying. By proper selection of the cross-sectional area of the venturi and the supply line from the tank of fluid to be evacuated, the desired mixture of air and evacuated fluid can be achieved. In the prior art, the valves in either or both fluid paths are independent of the venturi creating device which creates the necessary vacuum for evacuating the fluid from the tank.

It would prove useful to have a valve with the usual shut-off characteristics which incorporates a venturi chamber therewithin. Such a device could also prove useful as a fluid pressure amplifier when the outlet port is closed and the venturi chamber is in the normal position. The present invention provides such a device.

SUMMARY OF THE INVENTION

In accordance with the illustrated embodiment, the present invention provides a ball valve with a venturi chamber internal thereto as an integral part of the ball itself. The ball valve of the present invention includes a housing with a ball valve rotatably mountable therewithin. The ball is rotatably about an axis about which any cross-section thereof has a uniform outline curve with two passages defined therewithin.

In one embodiment, the first passage has a uniform cross-sectional shape and area, and extends through the ball with the central axis of the first passage being substantially perpendicular to the rotational axis of the ball. The first passage is disposed to receive a tapered tubular section with its inner and outer dimensions varying over its length with the outer shape and dimensions of the larger end being substantially the same as the inner shape and dimensios of one end of the first passage. When inserted into the first passage, the smaller end of the tubular section extends toward the outer end of the first passage defining a tapering annular cavity between the inner walls of the first passage and the outer walls of the tapering section. In a second embodiment, the first passage is formed with the tapering section included therewithin rather than using a separate piece of material.

In both embodiments the second passage has uniform shape and area, and opens into the first passage from one side of the ball commuinicating with the annular cavity. The central axis of the second passage is also substantially perpendicular to the rotational axis of the ball. In addition, in both embodiments, the housing defines first and second ports for communicating with opposite ends of the first passage and a third port for communicating with the second passage or the opposite solid side of the ball with the ball rotated through 180°. Additionally, the housing is configured so that the third port is disposed to communicate with the second passage when the first and second ports are in communiction with the one and other ends of the first passage, respectively.

The ball valve of the present design can also be used as a flowing fluid pressure amplifier. This can be done by placing a cap on the second port of the housing to divert the fluid flowing from the smaller end of the tubular section to the third port through the second passage. Fluid thus diverted will be under a higher pressure than the fluid entering through the first port.

DESCRIPTION OF THE DRAWINGS

FIG. 1 is a partial cut-away, perspective view of a ball valve of the present invention.

FIGS. 2 and 3 are simplified cut-away, top plan views, or schematics, of the ball valve of FIG. 1 with the side port open and closed, respectively.

FIG. 4 is a simplified, cut-away, top plan view, or schematic, of the ball valve of FIG. 1 with the side port open and the outlet port capped to provide fluid pressure amplification.

DESCRIPTION OF THE PREFERRED EMBODIMENT

Referring now to FIG. 1, there is shown a ball valve that incorporates the features of the present invention. The present invention includes a main body section 1 having its upper right outlet quadrant cut-away to allow viewing of the interior configuration of the valve. In the central region of body 1 is a pivotally mounted ball 2 defining a cylindrically shaped passage 11 through the center thereof. Mounted within passage 11 is a truncated conical section 3 with a conically shaped passage 12 therethrough. The large diameter end of the conical section 3 is coincident with, and of substantially the same diameter as, the cylindrical passage 11 through ball 2. The small diameter end of the conical section 3 extends toward the other end of cylindrical passage 11 and is of a smaller diameter than the passage 11 creating a tapering annular cavity within passage 11 surrounding conical section 3. Perpendicular to the axis of passage 11 and attached to the outer surface of ball 2 is a shaft 10 which extends through body 1 to provide a means for rotating ball 2 as desired within body 1. Ball 2 may be of any shape so long as its curvature as rotated about shaft 10 is substantially uniform, i.e. cylindrical, conical, spherical, ellipsoidal, or defined by any higher order curve so long as any cross-section of ball 2 having the axis of shaft 10 therein has the same outline curve as any other such cross-section. Also, any cross-section of ball 2 taken perpendicularly to the axis of shaft 10 is restricted to being a circle to permit ball 2 to rotate within body 1 while remaining sealed in all positios. Ball 2 also defines therewithin in communication with and opening into one side of passage 11, a second cylindrically shaped passage 13 (see FIGS. 2-4) with its axis perpendicular to the axis of passage 11 and in the imaginary plane defined by the axis of passage 11 as ball 2 is rotated about shaft 10.

Body 1 defines a ram fluid inlet port 4, a mixed flow outlet port 5, and an induced flow ot 6. Ports 4 and 5 are aligned one with the other on opposite sides of body 1. Ports 4 and 5 are sized and positioned to communicate with opposite ends of passage 11 through ball 2. Port 6 is positioned so that a vector perpendicular to the plane of a cross-section thereof is perpendicular to similar vectors perpendicular to cross-sections of ports 4 and 5. Being so placed, port 6 communicates with the second passage 13 of ball 2 when ports 4 and 5 are in communication with the end of passage 11 containing the large and small diameter ends of conically shaped passage 12, respectively (see FIG. 2). Similarly, when ball 2 is rotated through 180°, port 6 is in communication with the solid side of ball 2 and thus closed (see FIG. 3) and ports 4 and 5 are in communication with opposite ends of passage 11 through ball 2.

To direct the fluids to and from ports 4, 5 and 6, body 1 is disposed to have mounted thereon couplers at those port locations. Port 6 is shown having a threaded coupler 14 for receiving connecting tubing from the tank from which the fluid is to be extracted. Ports 4 and 5 could also have a threaded coupler mounted opposite them. For the application of spraying by aircraft, where the ram fluid to be used is the moving air relative to the aircraft, a truncated conically shaped funnel 8 is provided facing forward on the aircraft to capture the air and direct it to port 4. Similarly, opposite port 5 is a second truncated conically shaped funnel 9 to conduct the atomized liquid from port 6 away from the valve. Additionally, depending on the fluids being conducted by the valve, fluid tight seals such as sealing seat 7 may be necessary to prevent the fluids from leaking from the system or into interior portions of the valve.

The operation of a valve of the present invention is illustrated in schematic FIGS. 2, 3 and 4. In FIG. 2, as in FIG. 1, ball 2 is oriented so that port 6 is open to the interior of ball 2. This allows a ram fluid to pass through port 4 into the large diameter opening of truncated conical section 3 of ball 2. The restriction of section 3 through which the ram fluid must pass causes that fluid to increase in velocity thus creating negative pressure relative to the ambient pressure starting at the exit orifice of section 3 and extending to all of the cavities surrounding section 3, including port 6. The negative pressure thus created causes the fluid contents of any reservoir coupled to port 6 to be drawn through port 6 into passage 11 where it is mixed by the shearing or venturi action of the high velocity ram fluid passing therethrough. This effect is known as the venturi effect. When air is the ram fluid, the fluid drawn in through port 6 is atomized and output through port 5. To achieve a desired fluid-air mix the ratio of the cross-sectional area of port 6 and the small end of passage 12 must be selected to achieve that mix.

In FIG. 3, ball 2 has been rotated through 180° from its position in FIG. 2 closing port 6. In this position, ram fluid flow from port 4 to port 5 passes through passage 12 in the reverse direction. This position of ball 2 also results in the removal of any residual fluid from passages 11 and 12.

Referring next to FIG. 4, ball valve 2 is positioned as in FIGS. 1 and 2 so that port 6 is open. In addition, port 5 is shown with a removable cap 15 closing off the mixed flow outlet. In this configuration a positive fluid pressure will be transmitted to and through port 6, thus the valve becomes a fluid pressure amplifier when cascaded with a ball valve (FIG. 1) embodying the present invention. This amplification of pressure has many potential uses including being cascaded with a second valve of the present invention that is being used for evacuating a supply tank. This will permit the increased ram fluid pressure or air flow without having to increase the capacity of a compressor, increase the fluid head, or increasing the air speed of an aircraft wherein the present invention is being used as part of an aerial spraying system.

In the final application, shaft 10 may be rotated manually or motorized by pneumatic, hydraulic or electrical means to rotate ball 2 through 180° and returned. The rotation of ball 2 may be either continuous or by reverse rotation.

From the foregoing description, it will be apparent that the invention disclosed herein provides a novel and advantgeous ball valve design. As will be understood by those familiar with the art, the inventio may be embodied in other specific forms without departing from the spirit or essential characteristics thereof.

What is claimed is:

1. A ball valve assembly comprising:
   a housing;
   a ball rotatably mountable within said housing about an axis of the ball about which any cross-section thereof has a uniform outline curve, said ball defining therewithin:
   a first passage of uniform cross-sectional shape and area extending through the ball with the central axis through said first passage being substantially perpendicular to the rotational axis of the ball; and
   a second passage of uniform cross-sectional shape and area opening into said first passage from one side of the ball with the central axis through said second passage being substantially perpendicular to the rotational axis of the ball; and
   a tapered tubular section in which the inner and outer dimensions vary over its length with the outer shape and dimensions of the larger end thereof being substantially the same as the inner shape and dimensios of one end of said first passage to be captured therewithin with the smaller end of the tubular section extending toward the other end of said first passage to define a tapering annular cavity between the inner walls of said first passage and the outer walls of the tapered tubular section, said cavity tapering into the ball from the other end of first passage with said second passage in communication with said cavity;
   said housing defining first and second ports for communicating with opposite ends of said first passage and a third port for communicating with the second passage or being closed by the solid surface of the ball in response to the rotation of the ball, said third port also being disposed to communicate with the second passage when said first and second ports are in communication with said one and other ends of the first passage, respectively,
   said first port conducting fluid under pressure into said first passage, said third port conducting fluid into said second passage when said first and second ports are in communication with said first passage and said second passage is in communication with said third port, said tapered tubular section increasing the velocity of fluid flow through said first passage to create a negative pressure in said tapering annular cavity for inducing fluid in said second passage to flow into said first passage when said first and second ports are in communication with opposite ends of said first passage and said second passage is in communication with said third port, said second port discharging therefrom atomized fluid by the shearing action of the increased velocity of said fluid under pressure when said first and second ports are in communicatio with opposite ends of said first passage and said second passage is in communication with said third port, said first passage being cleansed of fluid remaining therein which was induced from said second passage when said first and second ports are in communication with said first passage and said third port is closed by the solid surface of the ball.

2. A ball valve assembly as in claim 1 wherein:
said first passage is cylindrical; and
said tapered tubular section is a truncated conical section.

3. A ball valve assembly as in claim 1 wherein the central axis of the first and second passages are substantial perpendicular to each other.

4. A ball valve assembly as in claim 3 wherein the first and second ports are in alignment with each other on opposite sides of the housing and the third port is disposed so that a vector perpendicular to the plane of the mouth of the third port is substantially perpendicular to the vectors perpendicular to the plane of the mouths of the first and second ports.

5. A ball valve assembly as in claim 1 further includes a shaft affixable to the ball for rotation of the ball about its axis about which it has a uniform outline curve with the shaft extending outward through said housing.

6. A ball valve assembly as in claim 1 wherein said ball has a circular cross-section when taken perpendicularly to its axis about which it has a uniform outline curve between its top and bottom extremes.

7. A ball valve assembly comprising:
a housing;
a ball rotatably mountable within said housing about an axis of the ball about which any cross-section thereof has a uniform outline curve, said ball defining therewithin:
a first passage therethrough with the central axis of said first passage being substantially perpendicular to the rotational axis of the ball, from one end of the first passage said first passage tapers inward toward the other end of the first passage with the interior end of the tapering portion opening toward the other end with a smaller cross-sectional area than the end of the tapering portion at said one end, and from the other end of the first passage a tapering annular cavity is defined around the narrowing end of the tapering portion; and
a second passage of uniform cross-sectional shape and area opening into said cavity of said first passage from one side of the ball with the central axis through said second passage being substantially perpendicular to the rotational axis of the ball;
said housing defining first and second ports for communicating with opposite ends of said first passage and a third port for communicating with the second passage or being closed by the solid surface of the ball in response to the rotation of the ball, said third port also being disposed to communicate with the second passage when said first and second ports are in communication with said one and other ends of the first passage, respectively,
said first port conducting fluid under pressure into said first passage, said third port conducting fluid into said second passage when said first and second ports are in communication with said first passage and said second passage is in communication with said third port, said tapering portion increasing the velocity of fluid flow through said first passage to create a negative pressure in said tapering annular cavity for inducing fluid in said second passage to flow into said first passage when said first and second ports are in communication with opposite ends of said first passage and said second passage is in communication with said third port, said second port discharging therefrom atomized fluid by the shearing action of the increased velocity of said fluid under pressure when said first and second ports are in communication with opposite ends of said first passage and said second passage is in communication with said third port, said first passage being cleansed by fluid remaining therein which was induced from said second passage when said first and second ports are in communication with said first passage and said third port is closed by the solid surface of the ball.

8. A ball valve assembly as in claim 7 wherein the central axis of the first and second passages are substantially perpendicular to each other.

9. A ball valve assembly as in claim 8 wherein the first and second ports are in alignment with each othr on opposite sides of the housing and the third port is disposed so that a vector perpendicular to the plane of the mouth of the third port is substantially perpendicular to the vectors perpendicular to the plane of the mouths of the first and second ports.

10. A ball valve assembly as in claim 7 further includes a shaft affixable to the ball for rotation of the ball about its axis about which it has a uniform outline curve with the shaft extending outward through said housing.

11. A ball valve assembly as in claim 7 wherein said ball has a circular cross section when taken perpendicularly to its axis about which it has a uniform outline curve between its top and bottom extremes.

12. A ball valve assembly comprising:
(a) a housing having an inner wall conforming generally to the contour of an outer wall of a ball, said housing comprising diametrically aligned input port and discharge port, said housing comprising an intermediate port;
(b) a multi-position ball rotatably mounted within said housing, said ball having an outer wall disposed in close proximity with the inner wall of said housing, said ball being formed with a diametrically disposed first passage and a radially disposed second passage communicating with said first passage;
(c) tapered tubular means disposed in said first passage, said tapered tubular means having an outer wall, a wider passage, and a narrower passage, said first passage being surrounded by a wall, a cavity being defined by the outer wall of said tapered tubular means and the wall surrounding said first passage;

(d) means conducting a first fluid under pressure into said inlet port; and (e) means conducting a second fluid into said intermediate port, (f) said ball in one position aligns said first passage with said input port and said discharge port for said inlet port to communicate with said discharge port through said first passage, in said one position said tapered tubular means has the wider passage thereof facing said inlet port and the narrower passage thereof facing said discharge port, said wider passage of said tapered tubular means being disposed in close proximity to the wall surrounding said first passage, in said one position said second passage is aligned with said intermediate port for said intermediate port to communicate with said discharge port through said second passage, said ball in another position aligns said first passage with said input port and said discharge port for said inlet port to communicate with said discharge port through said first passage, in said other position said ball interrupts communication between said intermediate port and said second passage, (g) in said one position of said ball the first fluid under pressure flows from said inlet port into said tapered tubular means wherein the velocity of the first fluid flow increases to create a negative pressure in said cavity for inducing second fluid in said second passage to flow into said first passage for said discharge port to discharge an atomized fluid by the shearing action of the increased velocity of said first fluid under presure, in said other position of said ball, said first passage is cleansed of fluid remaining therein which was induced into said first passage from said second passage.

* * * * *